United States Patent [19]
Kornbrekke et al.
[11] Patent Number: 4,563,625
[45] Date of Patent: Jan. 7, 1986

[54] AUTOMATIC DOOR CONTROL SYSTEM

[75] Inventors: Henning N. Kornbrekke, Burlington; Leon Boiucaner, Farmington, both of Conn.
[73] Assignee: The Stanley Works, New Britain, Conn.

[21] Appl. No.: 611,479
[22] Filed: May 17, 1984
[51] Int. Cl.[4] .......... G05B 19/28
[52] U.S. Cl. .......... 318/603; 318/283; 318/602; 318/640; 318/341
[58] Field of Search .......... 318/282, 269, 283-293, 318/603, 640, 602, 341

[56] References Cited

U.S. PATENT DOCUMENTS 4,035,702 7/1977 Pettersen et al. .......... 318/283
4,234,833 11/1980 Barrett .......... 318/282
4,263,536 4/1981 Lee et al. .......... 318/258 X
4,404,558 9/1983 Yen .......... 318/285 X
4,449,078 5/1984 Ogishi et al. .......... 318/603 X

*Primary Examiner*—B. Dobeck
*Attorney, Agent, or Firm*—Prutzman, Kalb, Chilton & Alix

[57] ABSTRACT

An automatic control system for controlling the operation of a sliding door system employs an electric motor for driving the sliding door system. An encoder is mounted to the shaft of the motor for generating signals which are decoded to detect the operational position of the sliding door system. A clock paced sequential logic circuit produces speed and directions signals in accordance with the detected operational position to control the speed and direction of the electric motor. Means are provided for recording the last stop position and slowing the sliding door system prior to reaching the last stop position. Safety means are provided to de-energize the motor in the event of malfunction of the motor speed control. The system also includes a reduced opening stop feature and a means for automatically establishing a sliding door reference position.

22 Claims, 10 Drawing Figures

AUTOMATIC DOOR CONTROL SYSTEM

BACKGROUND OF THE INVENTION

This invention relates to automatic sliding door systems of a type wherein a door panel or a pair of cooperating panels are driven between opened and closed positions along a linear path. More particularly, this invention relates to a sliding door system employing an automatically controlled direct current motor which provides a rotary drive for driving one or more sliding doors.

In automatic conventional sliding door systems employing a pair of cooperating doors which open and close in tandem along a linear track, an electric motor functions as the prime mover of the doors. The doors are connected to a upwardly disposed tooth belt which is suspended between a pair of pulleys. The rotary drive of the motor is translated into linear motion of the doors. Header mounted switches or other microswitches positioned along the track are conventionally employed to sense the actual position of at least one of the doors and to employ the door position information to control the operation of the motor. The present invention is a new and improved automatic door control system which does not require header mounted switches or microswitches to determine the actual position of the doors.

BRIEF SUMMARY OF THE INVENTION

Briefly stated, the invention in a preferred form is an automatic control system for a sliding door system of a type wherein at least one door is moved along a linear path between closed and opened positions by means of the rotary drive of an electric motor. The control system employs a motor which produces bidirectional multispeed rotary drive. A motor control unit controls the direction and speed of the motor means and produces dynamic braking in the motor. A position control unit responsive to the rotary drive of the motor determines the linear position and direction of movement of a sliding door driven by the motor and produces position signals indicative thereof. A sensor detects an activating event and produces a corresponding operate signal. A motion control unit responsive to the position signals and the operate signal sequentially controls and paces the operation of the sliding door system by transmitting direction and speed signals to the motor control unit. In a preferred form, an encoder in the form of a four-slot rotor and two reflective sensors are mounted to the drive shaft of the motor. The position control unit employs signals generated by the encoder to determine opening and closing check zones and a closed position of the sliding door system and to produce corresponding signals indicative thereof. The motion control unit employs an eight-state, clock paced sequential logic circuit to generate direction and speed signals in accordance with signals produced by the position control unit. The motor control unit employs a pulse width modulator, a dynamic braking resistor, and a switching power transistor to selectively control the speed and direction of the motor and to brake the motor.

The motor control unit includes a speed control. The motor is de-energized on malfunction of the speed control. A reduced opening feature to adjustably limit the linear opening of the door is also provided. A memory records the last position at which a door stops and controls the closing speed of the door in relation to the last stop position. A re-opening feature is provided so that the door may be re-opened in the event that the door is stopped by an obstacle. Automatic means are provided to establish a reference open position. The motor operates at selective opening and closing speeds in accordance with linear position of the sliding door system.

A method for automatically controlling the operation of a sliding door system comprises driving the sliding door system by means of the rotary drive of a multispeed bidirectional motor and generating signals from the rotary drive. The operational position of the door system is detected by means of decoding the signals generated by the rotary drive of the motor and producing corresponding operational position signals. The method includes generating corresponding motor speed and motor direction signals by processing the operational position signals by means of a clock paced, timer controlled, sequential logic circuit, and selectively controlling the speed, direction, and braking of the motor in accordance with the speed and direction signals.

The method for controlling a sliding door system includes the steps of recording the last stop position of the sliding door system and slowing the sliding door system prior to reaching the last stop position. The method includes automatically establishing a reference position of the sliding door system.

An object of the invention is to provide a new and improved automatic control system for a sliding door system.

Another object of the invention is to provide a new and improved automatic control system for a sliding door system which does not require header switches or microswitches for sensing the actual position of a door.

Another object of the invention is to provide a new and improved automatic door control system incorporating an automatic speed control and having means for disabling the motor drive in the event of a malfunction in the speed control.

A further object of the invention is to provide a new and improved automatic door control system having means for automatically establishing a reference position for the sliding door system.

A yet further object of the invention is to provide a new and improved automatic door control system which operates in an efficient, reliable, and safe manner and wherein the last stop position of the door system is recorded and used as a reference position in the next closing sequence.

Other objects and advantages of the invention will become apparent from the drawing and the specification.

DETAILED DESCRIPTION OF THE INVENTION

Figure 1:
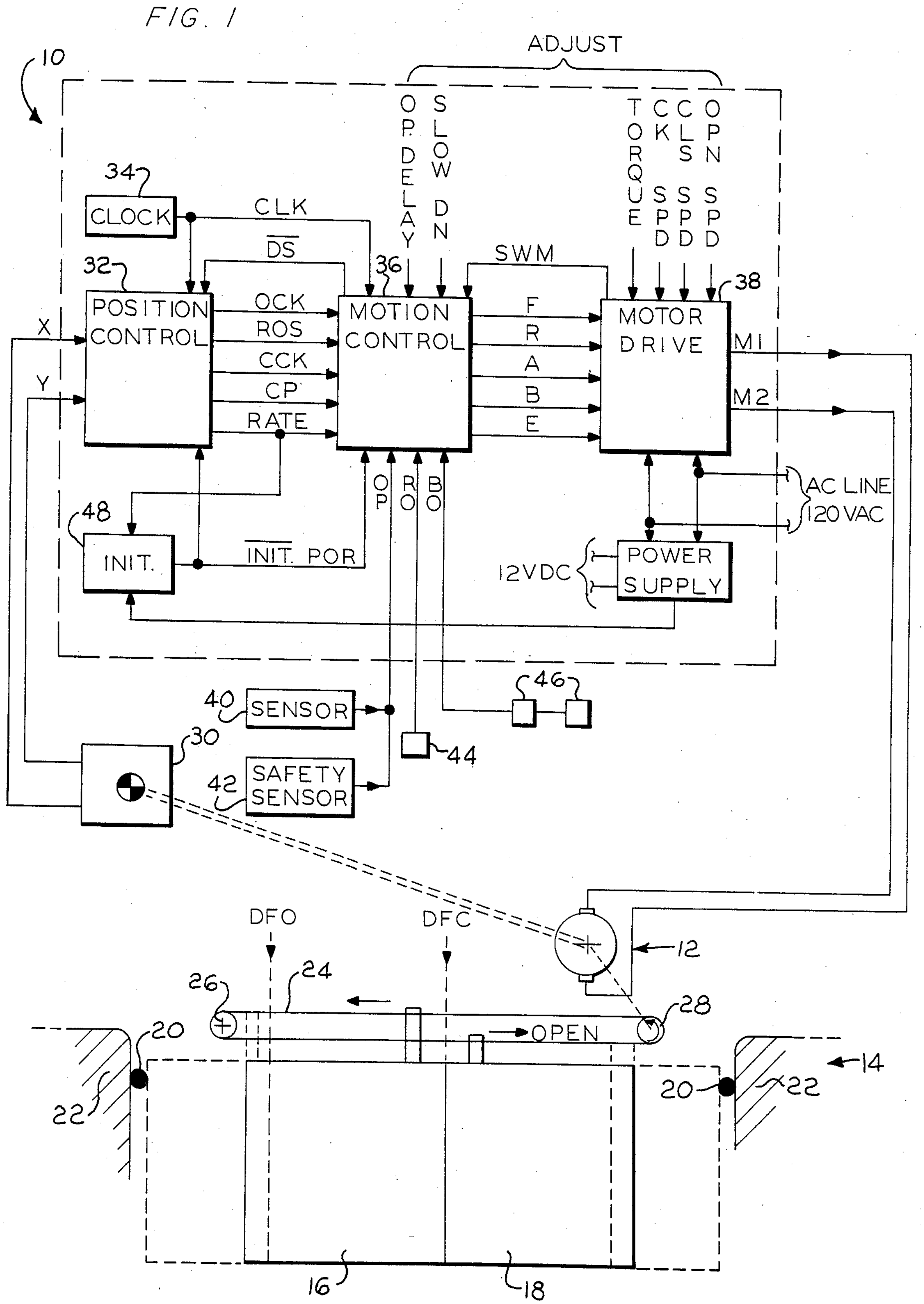
FIG. 1 is a block diagram and schematic representation illustrating an automatic door control system of the present invention.

With reference to the drawing wherein like numerals represent like parts throughout the several figures, an automatic door control system in accordance with the invention is generally designated by the numeral 10. The control system is particularly adaptable for controlling direct current motor 12 which provides a rotary drive for driving a sliding door system generally designated by the numeral 14.

Sliding door system 14 is exemplary of a number of sliding door systems with which the control system may be employed. Sliding door system 14 includes a pair of cooperating door panels 16 and 18. Door panels 16 and 18 are movable for sliding motion along a linear path between a closed position wherein the door panels cooperate to close an entranceway and an open position (illustrated by dashed lines) wherein the door panels retract to opposite sides of the entranceway to provide access to the entranceway. The full open position may be established by rubber bumpers 20 which are mounted on the door jamb 22. Door panel 16 is connected to an upper section of a continuous tooth belt 24 and door panel 18 is connected to a lower section of tooth belt 24. Tooth belt 24 is suspended between an idler pulley 26 and a drive pulley 28. Drive pulley 28 is rotatably driven by the DC motor 12 for linearly moving door panels 16 and 18 in cooperating opposite directions. The door panels may connect at the top to a wheel assembly which slides along a track (not illustrated). The foregoing sliding door system 14 is of a conventional form which is set forth for purpose of illustrating a preferred application for the invention herein and should not be deemed a limitation of the invention. The present invention is also adaptable for incorporation into a sliding door system employing a single sliding panel.

A pulse encoder 30 is mounted to the drive shaft of motor 12. In preferred form, encoder 30 employs a four-slot rotor coupled to the drive shaft and two reflective sensors to generate trains of position pulses, X and Y. The two sensors are positioned so that the X and Y signals appear in quadrature allowing for the detection of direction of movement of the drive shaft of motor 12, and consequently the direction of movement of door panels 16 and 18 of the sliding door system.

A position control unit 32 processes the X and Y signals and generates various signals which are indicative of the operational position of the door panels 16 and 18. An OCK signal indicates that the doors are opening in a check speed zone or slow-down zone, a CCK signal indicates that the doors are closing in a check speed zone or slow-down zone, a CP signal indicates that the doors are in the closed position, and a ROS signal indicates that the doors are opening in a reduced opening mode. A clock 34 generates a train of clocking pulses. The clocking pulses are employed by the position control unit 32 to generate a RATE signal which is indicative of the speed of motor 12.

A motion control unit 36 receives the OCK, ROS, CCK, CP, and RATE signals and generates speed and direction signals for a motor drive unit 38. The motion control unit 36 receives an OP signal to initiate an opening cycle. The OP signal is generated by a sensor 40 which detects an activating condition such as movement or presence in a specified area or the OP signal may be generated by a safety sensor 42. The motion control unit 36 also receives an RO signal from a reduced opening switch 44 and a BO signal from breakout switches 46.

An initialization circuit 48 monitors the power supply and generates a power on/off reset signal (POR) and an initialization signal (INIT) for transmittal to the motion control unit 36. Clocking pulses from clock 34 are also transmitted to the motion control unit 36. The motion control unit 36 generates a $\overline{DS}$ signal indicative that the doors are in a stopped mode. The $\overline{DS}$ signal is transmitted to the position control unit 32 for redetermination of the closed door reference position.

The motion control unit 36 generates direction command signals F and R and speed level signals A and B. The F, R, A, and B signals are transmitted to the motor drive unit 38 which has circuitry for controlling motor 12. An enabling SWM signal is transmitted from the motor drive unit 38 to the motion control unit 36. The SWM signal functions to permit the control system to operate only if the speed control circuitry in motor drive unit 38 is operational.

Control system 10 is adapted for controlling a sliding door system such a system 14 and functions to accomplish operational objectives, safety objectives, and initialization procedures. A further detailed description of control system 10 including the operation thereof may best be understood by reference to a detailed description of a preferred operational sequence of sliding door system 14. Door panels 16 and 18 move in opposite directions from a closed position wherein the panels cooperate to close off an entranceway to an open position wherein the panels retract to a full open position. For purposes of discussion, the full open position is defined as the linear position where the extreme vertical edges of the panels abut against bumpers 20. In the closed position, vertical edges of the panels converge to abut each other. For purposes of illustration, it will be assumed that the panels are centrally disposed relative to the entranceway, are substantially identical, and are equidistant from a central vertical axis at any given instant in the operation of the sliding door system. Under such circumstances, the sliding door system can be illustrated by reference to the edge of one of the door panels and the sliding door system may be conceptually reduced to reference to a single panel or door. The movement of the sliding door system 14 between the opened and closed positions results in the longitudinal displacement of the door edge a distance D between the door fully opened (DFO) position and the door fully closed (DFC) position. The linear position of a door edge at the DFO and DFC positions is illustrated by vertical lines in FIG. 1.

In the normal condition, the door may be viewed as in the DFC position. Upon the sensing of movement at the entranceway or the presence of a person or other activating event, the door starts moving to the DFO position. The initial acceleration of the door is determined by the current limit of motor 12 as established by the motor drive 38. When the door edge is at a preset distance from the DFO position, the moving door is slowed by means of dynamically braking the motor. The dynamic braking continues until the speed of the door (as measured by the motor speed) drops below a pre-established rate. At the pre-estabished rate, the motor is restarted in the driving mode at a relatively low check speed. The linear door movement continues at a low check speed until the extreme edge of the door contacts the bumper 20. The motor continues to be driven at a low preset current limit for about one second, and the motor is then turned off. The door is in the DFO position. Typically, the normal opening speed is approximately 2 feet/sec and the opening check speed is approximately 1/6 feet/sec.

The door remains in the DFO position as long as the system activating event exists. When the activating event no longer exists, a time count is commenced. When the time count elapses, the door will commence moving in the closing direction toward the DFC position. At a predetermined distance from the DFC position, the movement rate of the door is slowed by dynamically braking the motor. The braking continues until the door reaches a preestablished low rate of speed at which time the motor is restarted in a driving mode at a low check speed. The movement continues at the check speed until the door reaches the DFC position. The motor continues to operate for about one second at a limited current and is then turned off. Typically, the normal closing speed is approximately 1 feet/sec and the closing check speed is approximately 1/6 feet/sec.

In the event of an activating condition, resulting in a consequent transmittal of an operate signal, during the sequence when the door is moving in the closing direction, the movement rate of the door is immediately slowed by dynamically braking the motor 12. The movement of the door is then restarted in the reverse opening direction. The previously described opening sequence is then continued from the position of reversal until the DFO position is attained.

In the event that during the closing sequence an obstacle prevents the full closing of the door, the door edge contacts the obstacle with a limited force. If the door is stopped by the obstacle, the door automatically re-opens in the previously described opening sequence. During the succeeding closing sequence, the door will be slowed before reaching the position where the obstacle was encountered. In the event that the obstacle is still present, the door will nudge the obstacle at a low speed and with a low limited force. In the event that the obstacle remains, the motor will be turned off after the elapse of approximately one second. In the event that the obstacle is not encountered during the succeeding closing sequence, the door will continue to move at a slow speed until the door reaches the DFC position. The motor will then be turned off with a one second delay.

During the next succeeding closing sequence, the door operates in a normal sequence; i.e., the door brakes and slows shortly before reaching the DFC position. The control system essentially records the latest stopping position and initiates a slow rate of movement slightly before reaching the latest stopping position during the next succeeding closing sequence. During the next closing sequence, the door will continue to move at a slow rate of speed until the door is forced to stop. The motor is subsequently turned off after an approximately one second delay. In the event that the door stops at a position which is outside of the slowdown zone as recorded from the preceding closing sequence, a re-opening sequence as previously described is undertaken.

Sliding door system 14 may also incorporate additional operational features. In a reduced opening mode of operation, the door commences opening and after reaching a predetermined position before the DFO position, the door slows and stops. The width of the resulting reduced opening may be adjustable. The force at the door edge may be adjustably limited by limiting the motor current to the motor. Provision of this latter feature is advantageous for limiting the force at the door edge to a range within the requirements of applicable safety codes. Typically, the force at the door edge is set at approximately 28 pounds.

Figure 2:
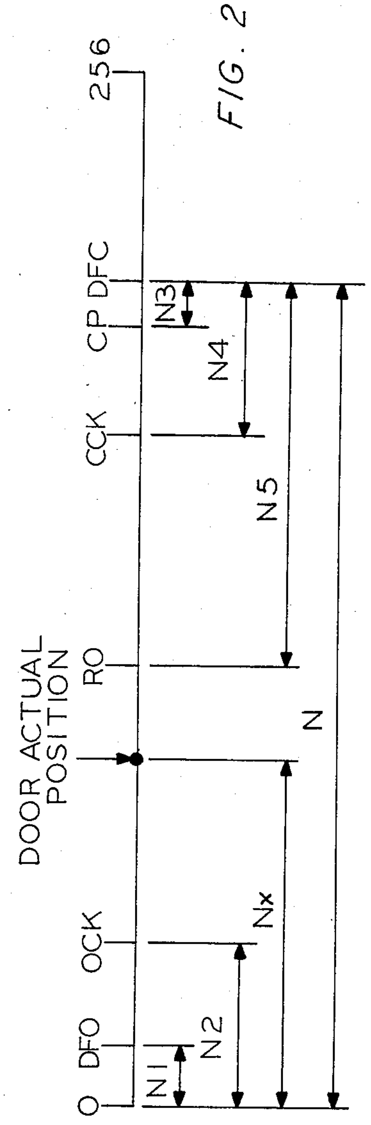
FIG. 2 is a schematic diagram illustrating various relationships between the actual position of a door employed in the automatic door control system of FIG. 1 and various operational positions of the door.
Figure 3:
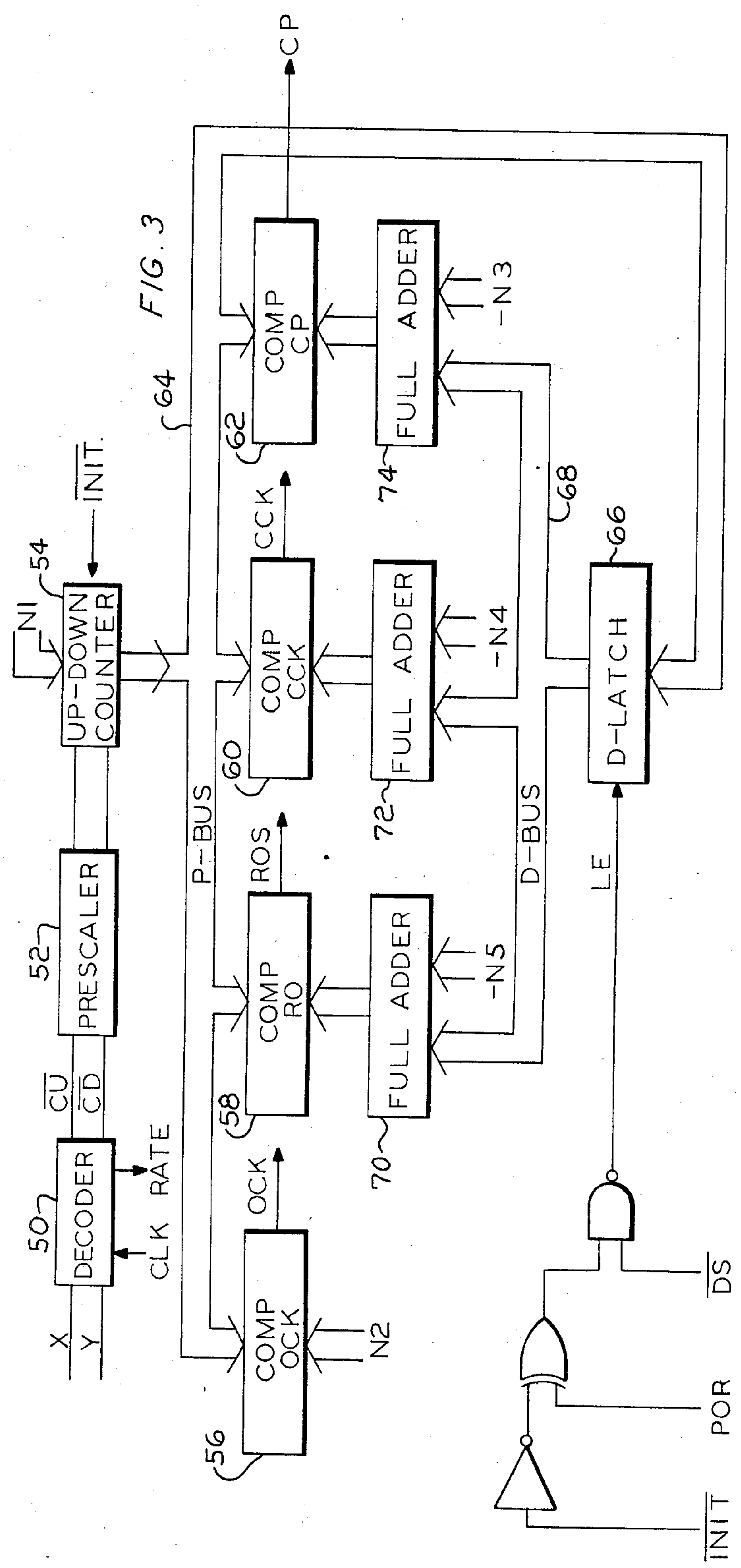
FIG. 3 is a block diagram illustrating a position control employed in the automatic door control system of FIG. 1.

With further reference to FIG. 2 and FIG. 3, position control 32 processes the X and Y signals emanating from pulse encoder 30 to determine the actual operational position of the door. Each of the X and Y signals assumes the form of a square wave in quadrature as a result of the form of the pulse encoder 30. A decoder 50 decodes the X and Y signals and generates pulses which are one clock unit in duration coinciding with each of the transitions of the X and Y signals. Consequently, in a preferred embodiment, a plurality of sixteen equidistant pulses are generated for each revolution of the drive shaft of motor 12. The relative position of the X and Y signals is indicative of the direction of rotation of the motor shaft. Decoder 50 generates output signals which are either a countup (CU) signal or a countdown (CD) signal. A countup/countdown prescaler 52 processes the CU and CD signals and transmits the processed signals to an eight bit up-down counter 54. Counter 54 essentially functions as a position indicator.

With specific reference to FIG. 2, a longitudinal door position scale encompasses a length of 256 counts. The door fully open reference, DFO, is selected at a small count N1 in order to provide a margin of error to compensate for door mechanics and avoid other problems associated with placing the reference point at the origin of a number scale. The number N1 is preset to counter 54 during the process of initializing the system. The count N at the DFC position which count is indicative of the maximum length of linear travel of the door varies in accordance with the door width and other factors related to the closing configuration of the door. The closed position, the closing check zone, the opening check zone, and the reduced opening stop are defined by subtracting corresponding pre-established counts N2, N3, N4, N5 from N. Consequently, each of the foregoing quantities is essentially expressed in terms of single variable N.

Digital comparators 56, 58, 60, and 62 are connected to a eight bit P-bus 64. The comparators compare the content of counter 54 with corresponding reference counts to generate the OCK signal, the CCK signal, the ROS signal, and the CP signals, respectively. The latter signals are correspondingly associated with the previously described opening and closing check zones, the reduced opening stop position of the door, and the closed position. The variable N is set as the content of an eight bit D-latch 66. D-bus 68 connects via full adders 70, 72, and 74 to comparators 58, 60, and 62, respectively. Adders 70, 72, and 74 add the complements of N3, N4, and N5, respectively to the N-count on D-bus 68 thereby performing N-N3, N-N4, and N-N5 subtractions, respectively. The count on counter 54 is compared with the N2 count on comparator 56 and a corresponding open check (OCK) signal is generated. The count on counter 54 is compared with the count on comparator 58 and a corresponding ROS signal is generated. The count on counter 54 is compared with the count on comparator 60 and a corresponding CCK signal is generated. The count on counter 54 is compared with the count on comparator 62 and a corresponding CP signal is generated.

The input count to D-latch 66 is the same as the input count to P-bus 64. D-latch 66 releases the count to D-bus 68 upon transmittal of a latch enable (LE) signal. The LE signal is subject to the $\overline{DS}$ signal which is actuated when the door is stopped either in a fully closed position or any other position outside of the check zones. As a consequence, the door will (in any closing sequence) start slowing down at a constant distance from the previously recorded last door stop position. The mode of operation adjusts automatically for door width while leaving the check and reduced opening zones constant. Also, a re-opening sequence initiated by the door encountering an obstacle will cause the door to slow before reaching the obstacle (or obstacle position if removed) a second time and then nudging the obstacle (if again encountered) for approximately one second before being turned off. Counts N2, N4, and N5 are presettable by hex switches which allow a operator to adjust within limits the width of the reduced opening and of each of the slow-down or check zones.

Decoder 50 also employs a time count generated by clock 34 and the X and Y signals to generate a RATE signal indicative of the actual speed of the motor.

Figure 4:
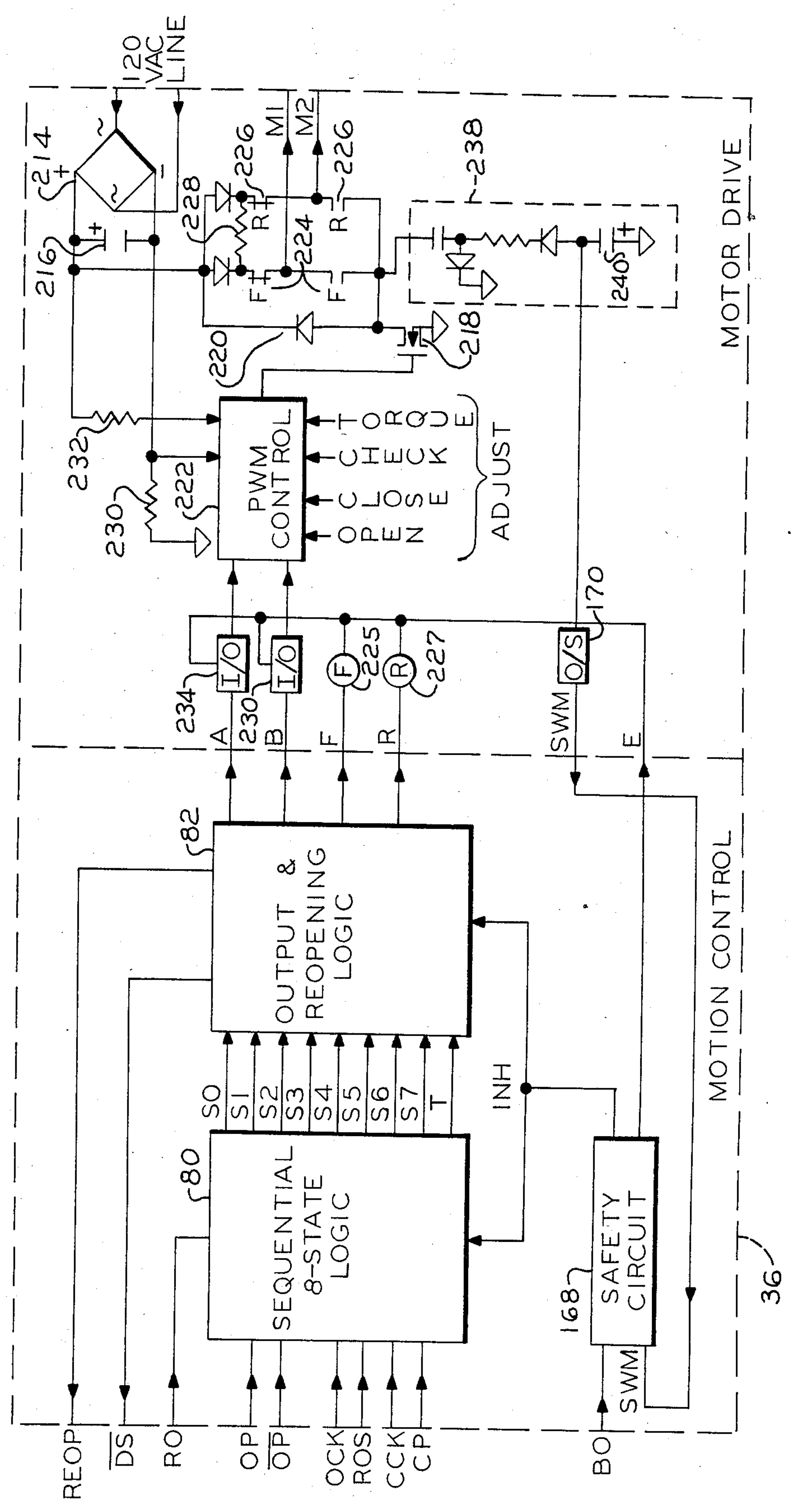
FIG. 4 is a block diagram illustrating a motion control and a motor drive control employed in the automatic door control system of FIG. 1.

With reference to FIG. 4, the motion control unit 36 includes an eight state sequential logic circuit 80, the output of which is processed by an output logic circuit 82 to control motor drive unit 38. The input signals to the logic circuit 80 are the OP signal, the OCK signal, the ROS signal, the CCK signal and the CP signal. The control system condition for each state of the sequential eight state output from logic circuit 80 is designated in Chart I:

CHART I

| STATE | CONTROL SYSTEM CONDITION |
|---|---|
| S0 | DRIVE IS OFF; MOTOR IDLES IN CLOSED POSITION |
| S1 | FORWARD RELAY IS ON |
| S2 | DRIVE IS ON, DOORS ARE OPENING |
| S3 | DRIVE IS OFF, FORWARD RELAY IS ON |
| S4 | DRIVE IS OFF, MOTOR IDLES IN THE OPEN POSITION |
| S5 | REVERSE RELAY IS ON |
| S6 | DRIVE IS ON, DOORS ARE CLOSING |
| S7 | DRIVE IS OFF, FORWARD RELAY IS ON |

During the operation of the control system, the states of Chart I change sequentially in numerical order. Under certain circumstances, the S1 and S5 states can be loaded directly. The specific state is determined by the combination of the foregoing described input signals and the status of various timer systems as will be described below.

Figure 5:
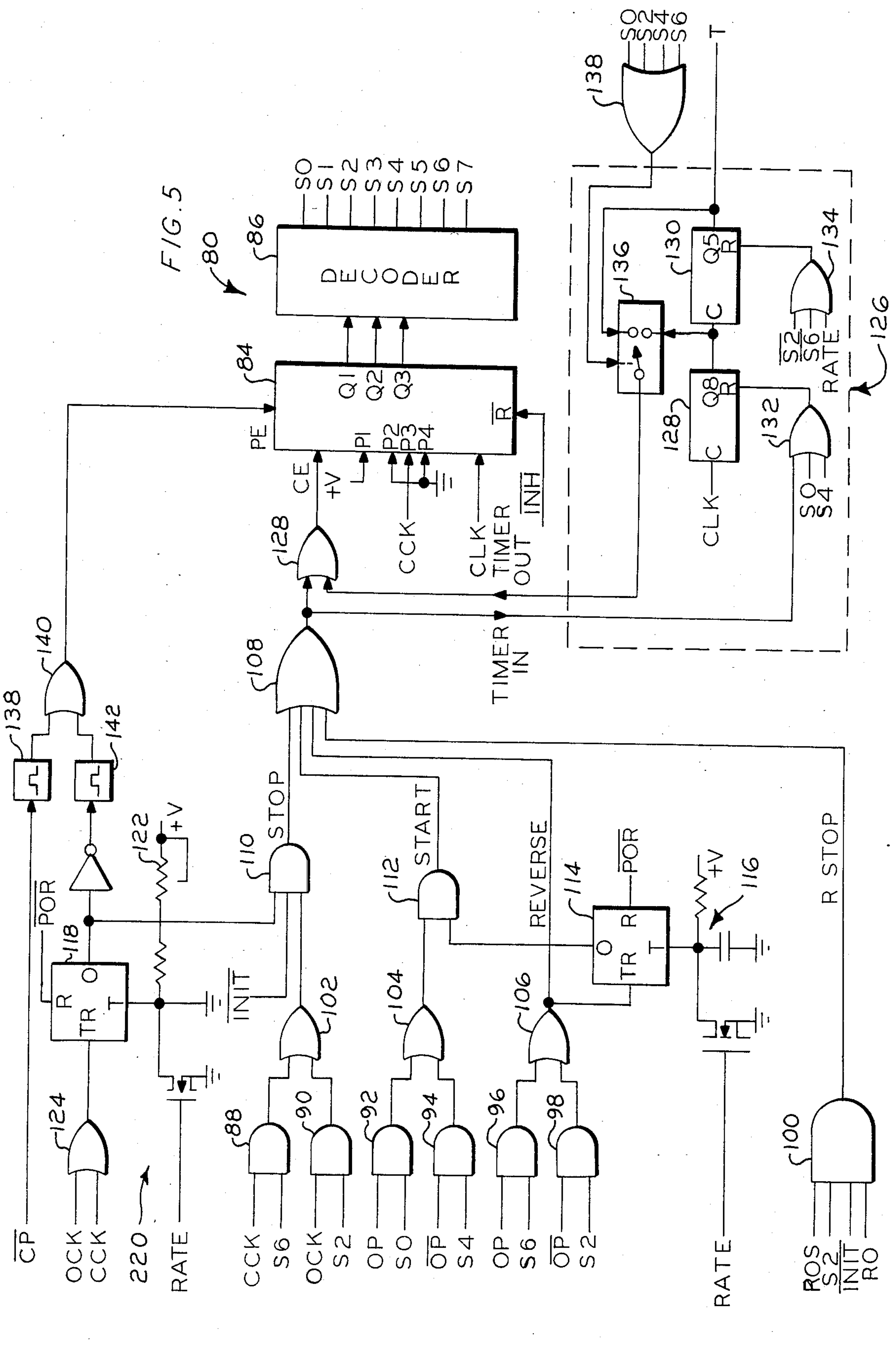
FIG. 5 is a schematic diagram illustrating a sequential logic circuit for the motion control of FIG. 4.

The operation of the logic circuit 80 may be illustrated by reference to FIG. 5 wherein a simplified diagram of logic circuit 80 is illustrated. When the doors are fully closed, the OP signal is off, the logic circuit 80 is in a S0 state, and the time on each of the timers has elapsed. The control system is in a stable idling state. A presettable four bit counter 84 receives a count enable signal CE which is in a low state. Counter 84 communicates with a decoder 86 which generates a corresponding S0, S1, S2, S3, S4, S5, S6, or S7 signal in accordance with the instruction from counter 84. The foregoin signals are indicative of the state of the logic circuit.

Logic circuit 80 includes AND gates 88, 92, 94, 96, 98, and 100. The CCK signal and the S6 signal are applied to AND gate 88. The OCK signal and the S2 signal are applied to AND gate 90. An OR gate 102 receives the output signals from gates 88 and 90. The OP signal and the S0 signal are applied to AND gate 94. Output signals from gates 92 and 94 are each applied to OR gate 104. The OP signal and the S6 signal are applied to AND gate 96. The $\overline{OP}$ and S2 signals are applied to AND gate 98. Signals emanating from gates 96 and 98 are applied to OR gate 106. An ROS signal, an S2 signal, an $\overline{INIT}$ signal, and a reduced opening (RO) signal are applied to AND gate 100 to produce a re-opening stop (RSTOP) signal which is applied to OR gate 108. A STOP signal generated from AND gate 110, a START signal generated from AND gate 112, and a REVERSE signal generated from AND gate 106 are also applied to OR gate 108.

A 555 type reversal timer 114 provides an output which is applied together with the output from OR gate 104 to AND gate 112. The trigger of timer 114 receives the output signal from OR gate 106. The threshold of timer 114 communicates with a RATE circuit 116 and is activated as long as a capacitor charges to a preset voltage. The reset of timer 114 is responsive to a $\overline{POR}$ signal. The output from timer 114 is in a high state as long as the $\overline{POR}$ signal is resetting the timer and the threshold voltage is present.

The OCK and CCK signals are applied to an OR gate 124. The output of OR gate 124 is transmitted to the trigger of a 555 type slowdown timer 118. The reset of timer 118 is responsive to the $\overline{POR}$ signal. The threshold of timer 118 communicates with a rate circuit including a slowdown adjustable potentiometer 122, a charging resistor, and a capacitor in circuit with the rate signal so that the threshold of timer 118 is activated as long as the capacitor charges to an adjustable pre-established voltage. The output signal from timer 118, an $\overline{INIT}$ signal, and an output signal from OR gate 102 are applied to AND gate 110. A state sequence timer circuit 126 generates a TIMER OUT signal which is applied together with a signal from OR gate 108 to OR gate 128. The output from OR gate 128 forms a count enable (CE) signal for counter 84.

State sequence timer 126 includes an eight bit counter 129 and a five bit counter 130. Timer 129 functions to interpose a short time delay, and timer 130 functions to interpose a longer time delay to the logic circuit. Counter 129 is paced by clock 34. Counter 129 is reset by an output signal from OR gate 132. The S0 signal, S4 signal, and the signal generated by OR gate 108 are applied to OR gate 132. A $\overline{S2}$ signal, $\overline{S6}$ signal, and RATE signal are applied to OR gate 134 to produce a signal which resets counter 130. The output signals from counters 128 and 130 are input to selector 136. The output from counter 130 also provides a T signal. The S0 signal, S2 signal, S4 signal, and S6 signal are applied to OR gate 138. OR gate 138 provides an output signal to selector 136 for selective activation of a switch connecting timers 129 and 130 for interposing various time delay intervals into the logic sequence. When the output signal from gate 138 is in a high state, the selector switch connects with the signal from timer 130.

A $\overline{CP}$ signal is fed to pulse shaper or monostable component 138. When timer 118 times out, a signal is transmitted to a pulse shaper or monostable component 142. Transition signals from pulse shapers 138 and 142 are applied to OR gate 140. The output from OR gate 140 provides a preset enable (PE) signal for counter 84.

When the sliding door system is in the DFC position and the OP signal is off, the logic circuit 80 is in the S0 state and timers 114, 118, and state sequence timer 126 are out. The control system is in a stable or idling state. The count enabling signal (CE) of counter 84 is in a low state. When the OP signal changes to a high state, the CE signal goes to a high state and counter 84 counts one clock pulse. Decoder 86 is transformed to an S1 state. The latter sequence results in setting the CE signal low and starts the state sequence timer 126. For the S1 state, timer 126 is preset at a short time interval by means of selector 136. Typically, the time interval is 32 msec. with a 4 kHz clock. The short time interval will also apply to the S3, S5, and S7 states. When timer 126 times out, the output goes to a high state so that the CE signal from OR gate 128 advances counter 84, and decoder 86 is transformed to the state S2. The CE signal is returned to the low state provided that no inputs are changed. The CE signal starts the state sequence timer 126 for a longer time interval; e.g., typically on the order of approximately one second.

In the S2 state, the motor 12 is activated so that the drive shaft is rotating and the RATE signal is present periodically resetting timer 126. Consequently, provided the input signals stay unchanged, timer 126 does not time out, and the S2 state is maintained indefinitely; i.e., the door is continuously opening. The door eventually enters the slowdown or opening check zone. Position control 32 senses the position of the door in the slowdown zone, and the resulting OCK signal is in a high state. Slowdown timer 118 is started. The STOP signal from AND gate 110 is in a high state. The resulting count enable CE signal via OR gates 108 and 128 is now in a high state. Counter 84 advances one clock and decoder 86 is now in the S3 state.

Timer 126 is restarted for another 32 msec. interval. The resulting CE signal is again in a high state and the counter advances one clock with the decoder being in the S4 state. In the S4 state, the motor drive is terminated and the motor 12 is in a braking mode. As long as the speed of the motor exceeds a preset value, the RATE signal keeps the slowdown timer 118 in a high state by periodically resetting the timer. The preset rate threshold value may be established by means of an adjustable potentiometer 122. As the motor decelerates, the time interval between successive rate pulses will increase. At a certain speed, slowdown timer 118 will time out resulting in the transmittal of a pulse via pulse shaper 142 to the counter preset enable line. The preset lines P1, P2, P3, and P4 are set to 0001 which state will be loaded and appear at the decoder as the S1 state thus restarting the opening sequence. The STOP signal will remain in a low state due to the low state at the output of slowdown timer 118. The output logic will take into account that the system is now operating in the slowdown zone and will force the setting of the motor drive to operate at a check speed. The timer 126 will be restarted in the S2 state and will force the setting of the motor drive to operate at a check speed. The timer 126 will be restarted in the S2 state and will be reset by the RATE signal as previously described.

When the door system reaches the fully open DFO position, the door movement will terminate and timer 126 will time out after one second. The decoder will then advance to the S3 state and subsequently advance to the S4 state where the logic circuit will idle until such time as the OP signal is off.

In summary, the foregoing sequence of events of opening the door system from the DFC position to the DFO position commences with logic circuit 80 in the S0 state. The OP signal advances the logic circuit to the S1 state. After a 32 msec. interval, the logic circuit is advanced to the S2 state. The OCK signal advances the logic circuit to the S3 state. After a 32 msec. delay, the logic circuit is advanced to the S4 state. The slowdown timer 118 returns the logic circuit to the S1 state. After 32 msec. interval, the circuit is advanced to the S2 state. After the doors hit the bumper 20 and a one second interval, the logic circuit is advanced to the S3 state. After a 32 msec. interval, the logic circuit is advanced to the S4 state.

The OP signal must go off (the $\overline{OP}$ signal on) in order to initiate the closing sequence. The closing sequence commences with the logic circuit 80 in the S4 state. The $\overline{OP}$ signal advances the logic circuit to the S5 state. After a 32 msec. delay, the logic circuit is advanced to the S6 state. The door is now closing. When the door enters the closing check zone, the CCK signal advances the circuit to the S7 state. After 32 msec. delay, the logic circuit is returned to the S0 state. After transmittal of a CP signal indicative that the door is closed and a one second delay, the logic circuit is advanced to the S7 state. After a 32 msec. delay, the logic circuit is advanced to the S0 state. The foregoing 32 msec. and 1 sec. time intervals are selected to provide efficient operation of the control system. Other time intervals could also be implemented.

In the event that the OP signal reappears while the door is closing; i.e., state S6, OR gate 106 generates a REVERSE signal which sets the CE signal high and advances the logic circuit to the S7 state. After a 32 msec. delay, the logic circuit is returned to the S0 state. The REVERSE signal also starts the reversal timer 114. The RATE signal from rate circuit 116 will prevent the timer from timing out until the motor decelerates; i.e., is braking in the S0 state at a speed below a preset speed. The START signal leading from AND gate 112 will be off until the timer 114 times out. When the speed of the motor has dropped to the preset levels, the START signal will be activated and the reversal timer 114 will advance logic circuit 80 to the S1 state and after 32 msec. to the S2 state wherein a new opening sequence is enacted as previously described.

A feature of the present invention is the incorporation of a reduced opening stop whereby the door is opened to a given maximum opening width which width may be selectively changed. In the reduced opening mode of operation, the RO signal is in a high state. When the opening door approaches the reduced opening stop position, the ROS signal goes to a high state. The RSTOP signal leading form AND gate 100 will set the CE signal high so that the logic circuit will advance to the S3 state and after 32 msec. to the S4 state. The logic circuit will remain in the S4 state until a closing sequence as previously described is commenced. The latter described reduced opening mode occurs when the reduced opening stop is positioned outside the opening check zone which is the normal situation. If the OCK signal is generated prior to the ROS signal, then the opening sequence and the reduced opening mode will also involve the normal slowdown in the opening check zone as previously described.

The system control also incorporates a passive door handling feature. If, while the door system is in the DFC position and the logic circuit is in the S0 state, an attempt is made to open the door by manual means, the door will move freely for a short distance until the CP signal is set to a high state. The CP signal will result an the S5 state being loaded in the logic circuit and the door will automatically reclose in the closing sequence. If the door is prevented from reclosing, and held for one second in a position where CP is low, a reopening sequence as described below will follow.

Figure 7:
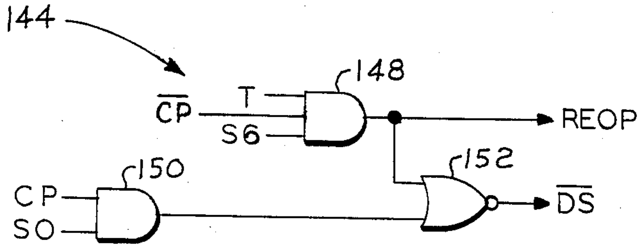
FIG. 7 is a schematic diagram of a re-opening logic circuit employed in the motion control of FIG. 4.

The control system provides for reopening the doors if the doors are stopped by an obstacle between the open and close check zones. With reference to FIG. 7, logic circuit 82 includes a reopening circuit designated generally as 144. Circuit 144 generates a reopening (REOP) signal in the event that state sequence timer 126 times out when the logic circuit is in the S6 state with no CP signal present. The AND gate 148 receives the T and S6 signals as well as the CP signal and provides a REOP output signal. A $\overline{DS}$ signal indicative that a door is stopped is also produced each time either a reopening is initiated or the door is fully closed. The CP signal and the S0 state signal are applied to AND gate 150 producing an output signal to the OR gate 152 which also receives the REOP signal. The output from OR gate 152 is inverted to form the $\overline{DS}$ signal which is transmitted to the position control 32.

Figure 8:
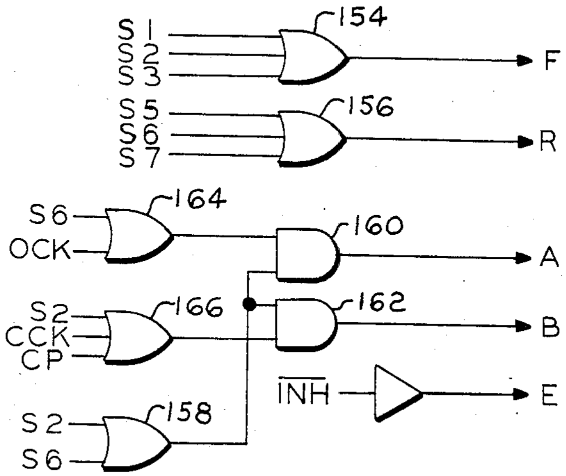
FIG. 8 is a schematic diagram of an output logic circuit employed in the motion control of FIG. 4.

With reference to FIG. 8, logic circuit 82 includes an output logic circuit 145 which provides command signals for the motor drive control. The S1 state, S2 state, and S3 state signals from decoder 86 are applied via OR gate 154 to produce a forward (F) signal. The S5 state, S6 state, and S7 state signals from decoder 86 are applied via OR gate 156 to produce a reverse (R) signal. The S2 state and S6 state signals are applied via OR gate 158 to produce a signal leading to AND gate 160 and AND gate 162. The S6 state signal and the OCK signal are applied via OR gate 164 to produce a signal leading to AND gate 160. AND gate 160 provides an A-drive level mode (A) signal. The S2 state signal, CCK signal, and CP signal are applied via OR gate 166 to produce a signal leading to AND gate 162. AND gate 162 produces an output signal for a B-drive level mode (B) signal.

Applicable building and safety codes require that the sliding doors be provided with a breakout means to allow the doors to be forcibly opened in an emergency situation. A breakout switch 46 may be provided to generate a signal indicative of a breakout condition. In a preferred form breakout switch 46 includes a mechanically or magnetically actuated switch which generates a high state signal when the sliding doors are in the operational sliding mode. If the breakout switch 46 is open, the corresponding breakout (BO) signal is in a low state and the INH signal is in a high state which results in resetting the presettable counter 84 to a 0 count.

Figure 6:
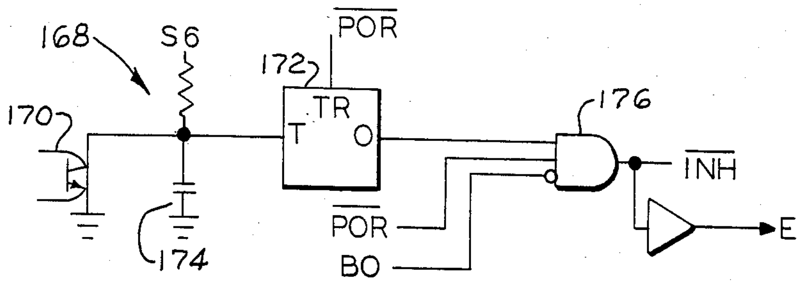
FIG. 6 is a schematic diagram of a safety circuit employed in the automatic door control system of FIG. 1.

A switching monitor (SWM) signal is generated in the motor drive unit 38 and is fed back to the motion control unit 36 so that the control system will start only if the speed control circuitry in the motor drive unit is operational. In the event of a failure in the speed control circuitry, the SWM signal will disable operation of the control system. With reference to FIG. 6, a safety circuit designated generally as 168 employs an optocoupler or phototransistor 170. The SWM signal derived from the motor drive 38 is interfaced via optocoupler 170. The phototransistor is in the on state if the switching of the speed control transistor 218 occurs. A 555 type timer 172 has an output which is set high by the power on reset (POR) signal. The output state will be maintained as long as the voltage at the timer threshold does not exceed two-thirds of the supply voltage. During the closing sequence when the logic circuit 80 is in the S6 state, capacitor 174 commences charging. The SWM signal will normally be on after a short delay beyond the commencement of the motor drive operation. Therefore, the SWM signal will discharge capacitor 174 before it reaches the threshold voltage. In the event that the motor drive unit 38 does not operate properly and the SWM signal is off, timer 172 will time out in approximately 100 milliseconds. The timer output signal, the $\overline{POR}$ signal, and the $\overline{BO}$ signal are applied to AND gate 176 to produce an $\overline{INH}$ signal leading to the reset of counter 84. Consequently, if the SWM signal is off, the logic circuit will be reset to the S0 state. To restart operation, the power supply must be turned off and on to reset timer 72 by means of a new POR pulse. The $\overline{INH}$ signal also is inverted to produce an enable (E) signal.

Figure 9:
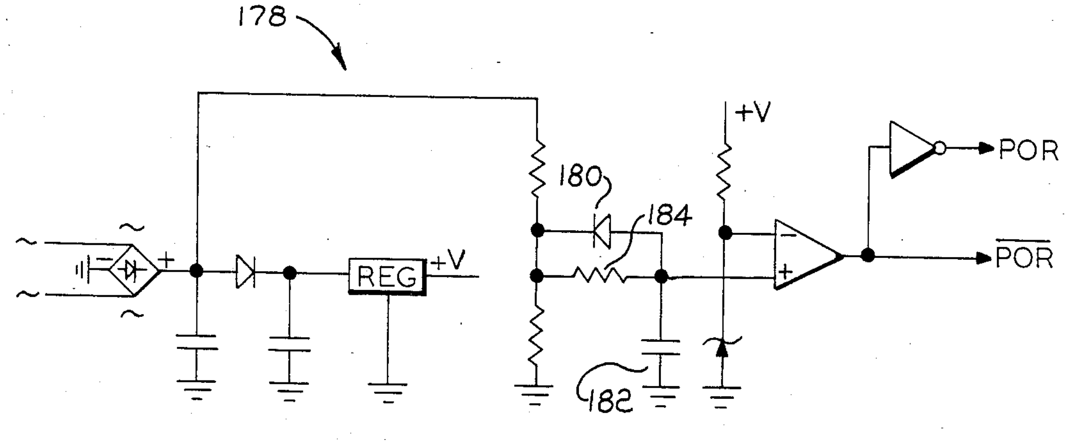
FIG. 9 is a schematic diagram of a POWER-ON/OFF reset circuit employed in the automatic door control system of FIG. 1.

With reference to FIG. 9, a reset circuit is generally designated by the numeral 178. When power is applied to the control system, an operational amplifier 180 generates a power on reset (POR) pulse. The timing of the pulse is determined by a capacitor 182 and resistor 184. The POR signal is applied to all of the timers and counters of the control system. The INH signal from safety circuit 168 will reset counter 84 to the 0 count.

Figure 10:
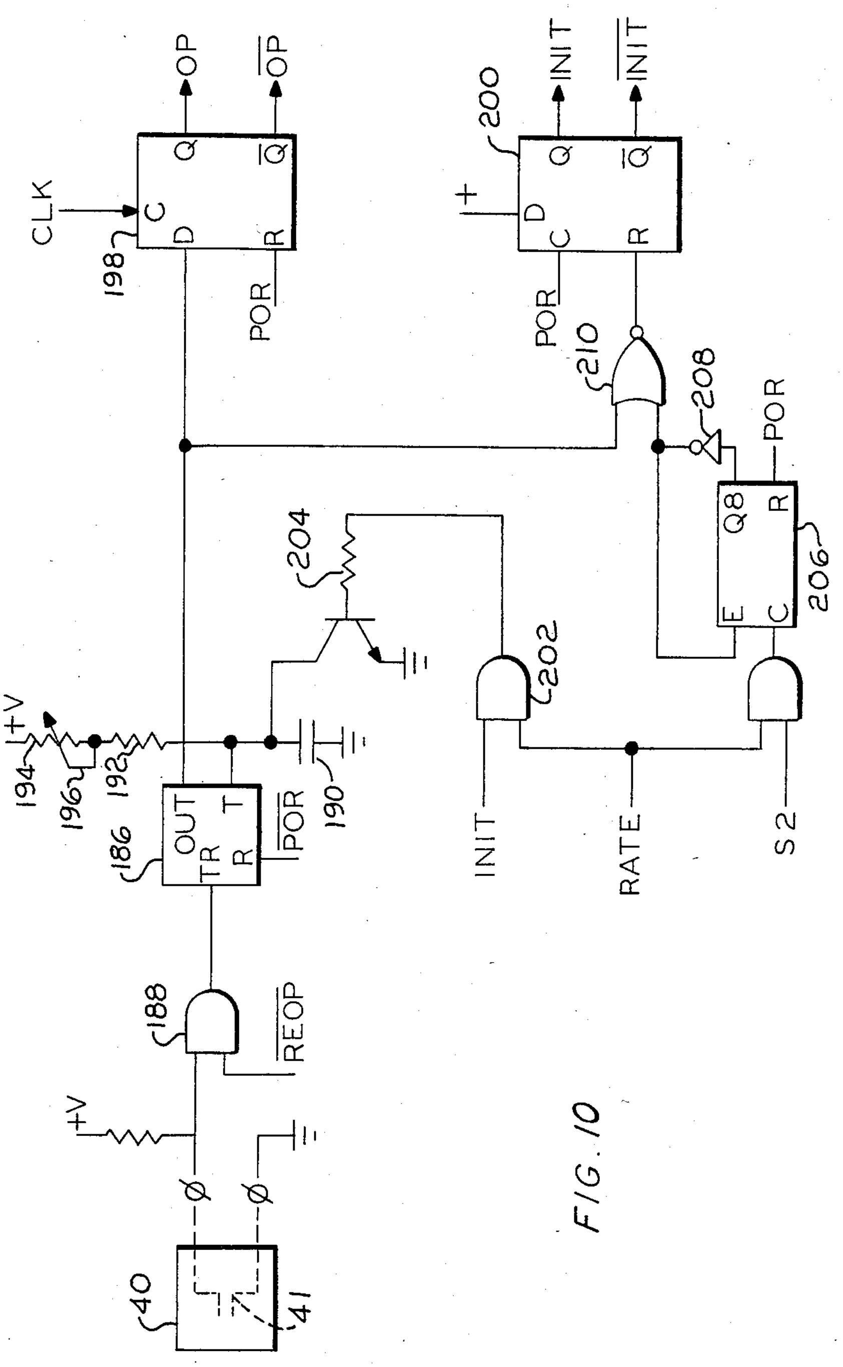
FIG. 10 schematic diagram of an operate timer and initialization circuit employed in the automatic door control system of FIG. 1.

FIG. 10 illustrates the operate timer and the initialization circuit 48. Operate delay timer 186 is a 555 type device. The operate contact 41 of sensor 40 is normally open so that the sensor output signal is in a low state. The sensor output signal and $\overline{REOP}$ signal are applied to AND gate 188 to produce an output to the trigger pin of timer 186. For as long as the output from sensor 70 is in a low state, the trigger of timer 186 will also be in low state and the timer output in a high state; i.e., the output signal from timer 186 is on. When the sensor contact opens, the OP signal will go off with a time delay defined by the values of capacitor 190 and resistors 192 and 194. A potentiometer 196 is employed to regulate the time delay interval. AND gate 188 will also interpose a time delay for the reopening signal going off. A D-type flip-flop 198 synchronizes the output signal from timer 186 with the pace of the clock 34 so that the OP signal is synchronized with the POR signal. The POR signal is also applied to a D-type flip-flop 200 which sets the INIT signal in a high state. The INIT signal sets the content of the counter 54 to a preset count N1. Thus, a temporary memory for initialization is provided for each POR signal. The $\overline{INIT}$ signal disables the RSTOP signal from AND gate 100. The INIT signal disables the stop signal from AND gate 110. The INIT signal and the RATE signal connect via AND gate 202 to enable the discharge transistor 204.

At the transmission of the first sensor operate signal, the door system starts opening. Operate timer 186 is maintained in a high state by the RATE signal acting via the discharge transistor 204. The high state endures for as long as the doors move and is accomplished so as to prevent the removal of the OP signal before the doors reach a fully open state. At the same time, the rate pulses are counted in the opening direction on the eight bit counter 206. When the last bit of the counter goes to a high state, the counter is latched in the state via inverter 208. At the instant that the door reaches the DFO position, the door movement ceases and timer 186 is restarted. When the timer times out, its output will go to a low state. If the door moved more than a certain distance in the opening direction; i.e., inverter 208 output is low, an inverted output from OR gate 210 will reset flip-flop 200. Therefore, the position reference is established with the door fully open. The door will then be started in a closing direction. The door will move at a slow speed in a manner wherein the entire door width is essentially set inside the closing slowdown zone by the INIT signal. When the door finally reaches the DFC position and stops a $\overline{DS}$ signal occurs and, a fully closed position reference is memorized and normal operation is commenced.

With further reference to FIG. 4, the DC motor is driven from a line voltage rectifier comprising a rectifier bridge 214 and a filter capacitor 216. A speed controller in the form of a switching transistor stepdown convertor comprising a switching transistor 218, a freewheeling diode 220, and a pulse width modulator (PWM) control unit 222 is interposed to control the motor speed. The motor direction and consequently the direction of movement of the door system is established by energizing a forward relay 224 for the opening mode or energizing a reverse relay 226 for a closing mode. A dynamic braking resistor 228 is employed so that when both the forward relay 224 and the reverse relay 226 are de-energized while the motor is moving, a dynamic braking action results with the braking energy being dissipated in braking resistor 228. The circuitry of the PWM control unit 222 controls the motor by varying the output voltage of the step-down converter in accordance with the required motor speed and the motor loading. The motor current is monitored by means of a current sense resistor 230. The rectifier voltage is monitored by means of a voltage sense resistor 232. The sensed current and voltage is transmitted to the PW control unit 222 for automatic compensation for line variations.

The speed reference for the motor is determined by decoding the A and B logic signals as described in Chart II:

CHART II

| SIGNAL STATE | MOTOR OPERATIONAL MODE |
|---|---|
| A = 0; B = 0 | MOTOR OFF |
| A = 1; B = 0; | MOTOR OPERATED AT CLOSING SPEED |
| A = 0; B = 1; | MOTOR OPERATED AT OPENING SPEED |
| A = 1; B = 1; | MOTOR OPERATING AT APPROACH OR CHECK SPEED |

The motor current limit is correspondingly selected in relation to the A and B signals.

The circuitry of motor drive unit 38 works directly off-line requiring isolation of all of the interface signals. Optocouplers 234 and 236 employed for the A signal and the B signal, respectively. As previously described, optocoupler 170 is employed with SWM signal. Relays 225 and 227 isolate the F and R signals, respectively.

Proper operation of the motor drive is in part dependent upon the coordination of the timing of the A signal, B signal, F signal, and R signal. When the motor is in a standing mode, the direction relay is energized first. After allowing sufficient time to compensate for the delays in the relay action, which time is approximately on the order of 30 milliseconds, the A and B signals are transmitted as appropriate and the motor commences operation. To slow down the speed of the motor, the A and B signals are first set to zero. This results in turning off the switching transistor 218. The direction relay is turned off after allowing sufficient time; i.e., approximately on the order of 30 milliseconds, for the motor current to decay. Upon de-energizing the direction relays, the motor is connected across braking resistor 228. The current flowing in resistor 228 when the motor moves will produce the dynamic braking action. In the event that reversing is required, the motion control will delay re-energizing of the direction relays until the motor is sufficiently slowed down by the braking action. This latter delay avoids a DC plugging condition which is detrimental to both the motor and the motor drive. In addition, the foregoing mode of operation avoids breaking relatively large DC currents by the contact elements of the relays.

A snubber circuit 238 functions to improve the turn-off process of the switching transistor 218. In addition, the snubber circuit incorporates a means for detecting the presence of the switching process. During the switching process, a negative DC voltage will develop on capacitor 240. The SWM signal results from the transmission of the presence of the voltage via optocoupler 170 to the motion control. To confirm that the switching transistor is operating, a failure of the switching transistor results in a lack of speed control such as for example the door system moving at high rates of speed and not slowing when required. If the SWM signal indicates a malfunction, the motion control will automatically open the direction relays. In the latter event, the control system is disabled by permanently removing the E signal, which signal, as illustrated in FIG. 4, is the power supply for optocouplers 234 and 236 and relays 224 and 226.

PWM control unit 222 includes potentiometers for adjusting the opening speed, the closing speed, and the check speed of the doors of the door system. The motor torque, and consequently the force at the edge of the doors, is determined by the motor current. The control unit 222 also includes circuitry for limiting the motor current to preset values.

The foregoing description of a control system for a sliding door system has been set forth for purposes of illustration and should not be deemed a limitation of the invention. Accordingly, various modifications, adaptations, and alternatives to the described automatic door control system may occur to one skilled in the art without departing from the spirit and scope of the present invention.

What is claimed is:

1. An automatic sliding door system of a type wherein at least one door is moved along a linear path between closed and opened positions by means of the rotary drive of an electric motor, said system comprising:

sliding door means movable between closed and opened positions;

motor means to produce bidirectional multispeed rotary drive for drivably moving said sliding door means;

motor control means to control the direction and speed of said motor means and produce dynamic braking therein comprising circuitry including a pulse width modulator to control the speed of the motor means and a braking resistor for effecting dynamic braking of the motor means position means responsive to the rotary drive of the motor means to translate the rotary drive into a linear position scale and determine the direction of movement of the rotary drive and to produce position signals indicative thereof;

sensor means to detect an activating event and produce an operate signal indicative thereof; and motion control means responsive to said position signals and operate signal to sequentially control and pace the operation of the motor means, said motion control means transmitting direction and speed signals to said motor control means.

2. The automatic door system of claim 1 wherein the motor means includes a motor having a drive shaft, an encoder being mounted to the drive shaft for generating position pulses, said position means being responsive to said position pulses.

3. The automatic door system of claim 2 wherein the encoder includes a four-slot rotor and two reflective sensors.

4. The automatic door system of claim 1 further comprising reference means to establish a reference position, said reference means comprising a counter for counting pulses generated in accordance with rotary drive of the motor means.

5. The automatic door system of claim 4 wherein the position means further defines an opening check zone in relation to said reference position and transmits a corresponding OCK signal to the motion control means when the rotary drive is operating in an opening direction in said opening check zone, the OCK signal selectively determining the speed signal to the motor control means.

6. The automatic door system of claim 4 wherein the position means further defines a closing check zone in relation to said reference position and transmits a corresponding CCK signal to the motion control means when the rotary drive is operating in a closing direction in said closing check zone, the CCK signal selectively determining the speed signal to the motor control means.

7. The automatic door system of claim 4 wherein the position means further defines a closed position of said sliding door means in relation to said reference position and transmits a corresponding CP signal to the motion control means when the rotary drive reaches the closed position.

8. The automatic door system of claim 1 wherein the motion control means includes an 8-state sequential logic circuit which generates direction and speed signals in accordance with the position signals produced by the position means.

9. An automatic sliding door system of a type wherein at least one door is moved along a linear path between closed and opened positions by means of the rotary drive of an electric motor, said sliding door system comprising:

sliding door means movable between closed and opened positions;

motor means to produce bidirectional multispeed rotary drive for driving the sliding door means in opening and closing directions including a drive shaft mounting an encoder means to generate a train of signals upon rotary motion of the drive shaft;

motor control means to control the direction and speed of said motor means;

sensor means to detect an activating event and produce an OP signal indicative thereof;

position means responsive to said train of signals to generate an OCK signal indicative that the door means is opening in an opening check zone, a CCK signal indicative that the door means is closing in a closing check zone, a CP signal indicative that the door means is in a closed position, and a RATE signal indicative of the speed of the drive shaft;

motion control means responsive to said OP, OCK, CCK, CP, and RATE signals to sequentially control and pace the operation of the motor control means, said motion control means selectively transmitting direction and speed signals to said motor control means; and reference means to automatically establish a reference open position for said door means, said opening check zone, said closing check zone, and said closed position being defined in relation to said reference open position.

10. The automatic door system of claim 9 wherein the motor control means includes a speed control means, said motor means being de-energized upon malfunction of said speed control means.

11. The automatic door system of claim 9 further comprising a reduced opening means to adjustably define the opened position of the door means.

12. The automatic door system of claim 9 further comprising a memory means to record the last position at which the door means is stopped and to control the closing speed of the door means in relation to said last position.

13. The automatic door system of claim 9 wherein the motion control means further includes reopening means for transmitting speed and direction signals to reopen the door means in the event that the door means is stopped by an obstacle.

14. The automatic door system of claim 9 wherein the motor means operates at a normal closing speed when the door means is closing in a zone outside the closing check speed zone and operates at a slower check speed when the door means is closing in the closing check zone.

15. The automatic door system of claim 9 wherein the motor means operates at a normal opening speed when the door means is opening in a zone outside the opening check speed zone and operates at a slower check speed when the door means is opening in the opening check speed zone.

16. An automatic sliding door system of a type wherein at least one door is moved along a linear path between closed and opened positions by means of the rotary drive of an electric motor, said sliding door system comprising:

sliding door means linearly movable between opened and closed positions;

motor means to produce bidirectional multispeed rotary drive for driving said sliding door means;

motor control means to control the direction and speed of the motor means;

encoder means to generate a pair of signal trains in accordance with the rotary drive of the motor means;

decoder means to produce position signals, direction signals and speed signals indicative of the operation of the sliding door means by decoding said signal trains;

motion control means to provide speed control and direction control signals to the motor control means in response to said position, direction, and speed signals so that said sliding door means is driven by said motor means in a closing direction at a selected speed in accordance with the linear position of the sliding door means and is driven in the opening direction at a selected speed in accordance with the linear position of the sliding door means, said motion control means comprising reference means to automatically establish a reference position for said sliding door means with the linear position of the sliding door means being defined in relation to said reference position.

17. The automatic door system of claim 16 further comprising a safety means to de-energize the motor means in the event of malfunction of the motor control means.

18. The automatic door system of claim 16 further comprising memory means to record the last linear stop position of the sliding door means and wherein the motion control means includes means for slowing the sliding door means prior to reaching the last stop position.

19. The automatic door system of claim 16 wherein the motion control means includes reopening means to provide speed control and direction control signals for reopening the sliding door means in the event that an obstacle is encountered.

20. A method for automatically controlling the operation of a sliding door system of a type wherein at least one door is moved along a linear path between closed and opened positions by means of the rotary drive of an electric motor comprising:

(a) driving a sliding door system by means of the rotary drive of a multispeed bidirectional motor;

(b) generating position pulses in accordance with the rotary drive of the motor;

(c) decoding the position pulses to produce operational position signals indicative of the position and direction of movement movement of said sliding door system;

(d) processing said operational position signals to produce corresponding motor speed and motor direction signals;

(e) controlling the speed and direction of said motor in accordance with the motor speed and motor direction signals; and (f) automatically recording the last stop position of the sliding door system and slowing the sliding door system prior to reaching the last stop position.

21. The method of claim 21 further comprising:

(g) automatically de-energizing the motor in the event of a malfunction in the process of controlling the speed of the motor.

22. The method of claim 21 further comprising:

(h) automatically establishing a reference position for said sliding door system.

* * * * *